United States Patent Office 2,993,900
Patented July 25, 1961

2,993,900
4-HYDROXYALKYLPIPERAZINOALKYL GLYCOLATES

John H. Biel, Milwaukee, Wis., assignor, by mesne assignments, to Lakeside Laboratories, Inc., Milwaukee, Wis., a corporation of Delaware
No Drawing. Filed Apr. 15, 1958, Ser. No. 728,513
7 Claims. (Cl. 260—268)

This invention relates to piperazine derivatives. More particularly, this invention is concerned with novel disubstituted glycolate esters of 4-hydroxyalkylpiperazinoalkanols and the use of these compounds as psychotherapeutics.

This application is a continuation-in-part of my copending application Serial No. 704,247, filed December 23, 1957.

According to the present invention there are provided novel disubstituted glycolate esters of 4-hydroxyalkylpiperazinoalkanols of the formula

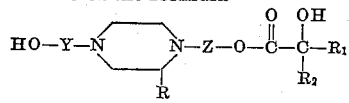

and acid addition salts thereof, wherein R is hydrogen or methyl, $R_1$ is phenyl, thienyl, pyridyl or cyclohexyl, $R_2$ is phenyl, thienyl, furyl, cyclohexyl, cyclopentyl or a lower alkyl, and Y and Z are straight or branched alkylene chains, particularly lower alkylene groups and especially those of not more than 5 carbons, but Y is at least a two carbon chain between the piperazino ring and the hydroxy group, and Z is at least a two carbon chain between the piperazino ring and the ester group.

These compounds as nontoxic acid addition salts produce an antihallucinogenic effect in humans making a patient more rational and communicative. The compounds also reverse the psychotogenic effect induced by administration of the piperidyl benzilates disclosed in my copending application Serial No. 704,247, filed December 23, 1957. The compounds also form salts with penicillin and thus can be used to isolate and purify this antibiotic. The intermediate benzyloxy compounds as well as the hydroxyalkyl derivatives possess anti-hallucinogenic and anti-psychotogenic properties.

These compounds may be conveniently produced by reacting a lower alkyl ester of a disubstituted glycolic acid with a 4-aralkyloxyalkylpiperazinoalkanol in the presence of an alkaline catalyst such as sodium or sodium methoxide to produce the corresponding 4-aralkyloxyalkylpiperazinoalkyl glycolate which is then subjected to reductive cleavage to produce the hydroxyalkylpiperazinoalkyl glycolate. This process may be represented as follows:

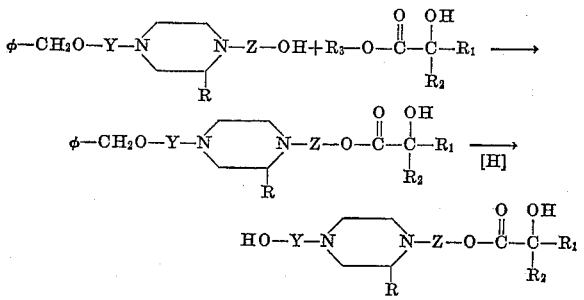

wherein $\phi$ is a hydrocarbon aryl group such as the phenyl and naphthyl group, Y, Z, R, $R_1$ and $R_2$ have the significance previously assigned and $R_3$ is a lower alkyl.

Representative of the disubstituted glycolic acid esters which may be used in the process are lower alcohol esters of benzilic acid, phenylcyclohexyl glycolic acid, phenyl- cyclopentyl glycolic acid, 2-thienyl phenyl glycolic acid, dicyclohexyl glycolic acid, furyl phenyl glycolic acid, 3-pyridyl phenyl glycolic acid, and di-2-thienyl glycolic acid.

Some of the 4-aralkyloxyalkylpiperazinoalkanols which may be used in this process are 4-(2-benzyloxyethyl)piperazinoethanol, 4-(4-benzyloxybutyl)piperazinopropanol, 4-(3-benzyloxypropyl)piperazinoethanol and the like.

The first step of the reaction is conveniently effected by bringing the reactants together in a nonreactive solvent such as n-heptane, methylcyclohexane, benzene, toluene or xylene. An excess of the 4-benzyloxyalkylpiperazinoalkanol may also be used as the reaction media. Elevated temperatures such as the reflux temperature are generally employed to increase the reaction rate. As the reaction proceeds, the low boiling alcohol formed in the ester interchange reaction is removed by distillation. After the theoretical amount of alcohol is collected the reaction is considered completed. The desired product may be conveniently recovered from the mixture by conventional means such as by fractional distillation.

Some of the products produced in this way are 4-(2-benzyloxyethyl)piperazinoethyl benzilate, 4-(3-benzyloxypropyl)piperazinopropyl 2-thienyl 3-pyridyl glycolate, 4-(2-benzyloxyethyl)piperazinoethyl 2-furyl phenyl glycolate, 4-(2-benzyloxyethyl)piperazinoisopropyl phenylcyclohexyl glycolate, 4-(2-benzyloxyethyl)piperazinoethyl phenyl 2-thienyl glycolate, and 4-(2-benzyloxyethyl)piperazinoethyl ethyl phenyl glycolate.

The benzyloxy group is cleaved from these and other compounds within the scope of this invention by the use of catalytic hydrogenation. Palladium-on-charcoal is a particularly satisfactory catalyst. A lower alcohol such as ethanol may be used as the hydrogenation medium. Low hydrogen pressures of 2 to 5 atmospheres and temperatures of 20 to 80° C. are suitable for effecting the cleavage. The hydrogenation may be considered completed when hydrogen uptake has ceased. Recovery of the product may be readily achieved by filtering off the catalyst, distilling off the solvent and crystallizing the residue from a suitable solvent such as ether.

Representative of the compounds produced in this way are 4-(2-hydroxyethyl)piperazinoethyl benzilate, 4-hydroxyethylpiperazinoethyl phenylcyclohexyl glycolate, 4-(3-hydroxypropyl)piperazinopropyl 2-thienyl 3-pyridyl glycolate, 4-(2-hydroxyethyl)piperazinoethyl 2-furyl phenyl glycolate, 4-(2-hydroxyethyl)piperazinoisopropyl phenylcyclohexyl glycolate, 4-(2-hydroxyethyl)piperazinoethyl phenyl 2-thienyl glycolate, and 2-methyl-4-(2-hydroxyethyl)piperazinoethyl benzilate.

According to an additional process, some of these compounds may be conveniently prepared by reacting a 4-acyloxyalkyl piperazinoalkanol with an alpha-halo-disubstituted acetyl chloride to produce the corresponding 4-acyloxyalkyl piperazinoalkyl-alpha-halo-(disubstituted) acetate ester which is then hydrolyzed to the hydroxyalkyl piperazinoalkyl glycolate. This process may be represented as follows:

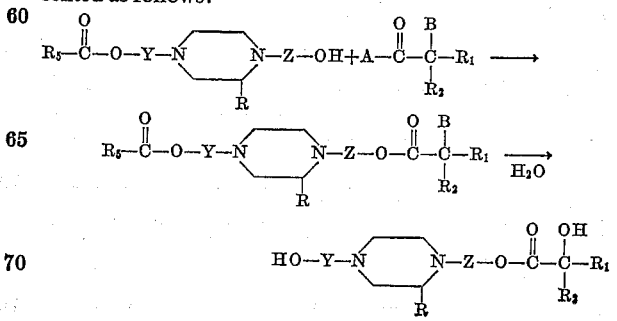

wherein Y, Z and R have the significance previously assigned, $R_1$ and $R_2$ are phenyl, 2-thienyl or pyridyl groups, $R_5$ is a lower alkyl group and A and B are the same or different reactive halogens.

A few of the 4-acyloxyalkylpiperazinoalkanols which may be used in this process are 4-(2-acetoxyethyl)piperazinoethanol, 4-acetoxymethylpiperazinomethanol, 4-(4-acetoxybutyl)piperazinopropanol, 4 - (3 - acetoxypropyl) piperazinoethanol and 2-methyl-4-(2-acetoxyethyl)piperazino piperazinoethanol.

Some of the alpha-halo-(disubstituted)acetyl halides which may be used in the process are diphenylchloroacetyl chloride, 2-thienyl phenyl chloroacetyl bromide, di-3-pyridylchloroacetyl chloride, di-2-thienylchloroacetyl chloride, and phenyl-3-pyridylchloroacetyl chloride.

In the first step of this alternative process the reactants are conveniently brought together in an inert organic solvent such as toluene, isopropanol and acetone. An acid acceptor such as triethylamine is generally included in the reaction mixture to remove the hydrohalic acid formed in the reaction. Elevated temperatures up to the reflux temperature are generally employed to enhance the rate of reaction and maintain solubility of the amino alcohol. Following reaction, the mixture may be worked up according to conventional methods to recover the desired 4-acyloxyalkyl piperazinoalkyl-alpha-halo-(disubstituted)acetate ester.

Typical of the compounds which are produced in this way are 4 - (2 - acetoxyethyl)piperazinoethyl diphenyl chloroacetate, 4-(3-acetoxypropyl)piperazinopropyl di-2-thienyl bromoacetate, 4-acetoxyethyl piperazinoethyl phenyl 3-pyridyl chloroacetate and 4-(4-acetoxybutyl) piperazinoethyl diphenyl chloroacetate.

Hydrolysis of these and similar compounds within the scope of this invention is readily effected with an aqueous mineral acid such as aqueous hydrochloric acid. By hydrolysis these acetoxy-haloacetates are converted to hydroxyalkyl piperazinoalkyl glycolates such as those named previously.

Acid addition salts of all of the novel compounds within the scope of this invention are produced by contacting the tertiary base with a suitable acid such as a mineral acid, for example, sulfuric acid or hydrochloric acid, or an organic acid such as maleic acid, fumaric acid, acetic acid or citric acid. Acid addition salts of the acetoxy-halo acetates are formed in the absence of water to avoid hydrolysis of the acetoxy and halo groups.

The compounds of this invention are generally formulated into suitable pharaceutical forms for administration to animals and humans. The preferred route of administration is orally and for this method tablets and capsules ore ordinarily recommended. Unit-dosages may contain from about 2.5 to 30 mgm. or more of one or more of the active compounds and they may be administered once or more a day or at other suitable intervals according to the condition of the patient.

Any suitable pharmaceutical carrier may be used with one or more of the active compounds to achieve a more practical volume for a unit-dosage. Sugar, starch and talc are suitable solid carriers which may be used in forming tablets and capsules. However, liquid carriers such as water may also be used as desired. One typical tablet may have the composition:

| | Mg. |
|---|---|
| (1) 4-beta-hydroxyethylpiperazinoethyl benzilate dihydrochloride | 10 |
| (2) Starch U.S.P. | 57 |
| (3) Lactose U.S.P. | 73 |
| (4) Talc U.S.P. | 9 |
| (5) Stearic acid | 6 |

Powders 1, 2 and 3 are slugged, then granulated, mixed with 4 and 5, and tableted.

The following examples illustrate the preparation of specific compounds within the scope of this invention.

EXAMPLE 1

*4-beta-acetoxyethylpiperazinoethyl diphenyl chloroacetate*

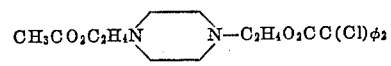

To 34 g. (0.157 mole) of 4-beta-acetoxyethylpiperazinoethanol in 200 cc. of benzene and 15.8 g. of triethylamine was added 41.6 g. (0.157 mole) of alpha-chloro-diphenyl acetyl chloride dissolved in 35 cc. of benzene. The mixture was stirred and refluxed for 2 hours, the triethylamine HCl separated by filtration and the benzene removed by distillation. The residue was dissolved in acetone and converted to the dihydrochloride salt with ethereal HCl. The gummy precipitate was crystallized by adding 20 cc. of acetonitrile. The crystalline solid was filtered, M.P. 210–213° C. dec.

*Analysis.*—Calcd. for $C_{24}H_{31}N_2O_4$: Cl, 20.57; N, 5.41. Found: Cl, 19.46; N, 5.64.

EXAMPLE 2

*4-beta-hydroxyethylpiperazinoethyl benzilate dihydrochloride*

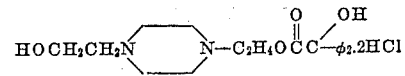

Fifty-seven gms. (0.11 mole) of the compound of Example 1 was dissolved in 300 cc. of hot water and 10 g. of activated charcoal added. The mixture was stirred at reflux temperature for ten minutes, filtered hot through a bed of Celite and the filtrate neutralized with sodium bicarbonate. The gummy base was extracted with chloroform and converted to the dihydrochloride salt by the addition of ethereal hydrochloric acid. The gummy precipitate was crystallized in ether, yield 29 g., M.P. decomposition at 170° C.

*Analysis.*—Calcd. for $C_{22}H_{30}Cl_2N_2O_4$: Cl, 15.53; N, 6.12. Found: Cl, 14.97; N, 6.00.

EXAMPLE 3

*4-beta-benzyloxyethylpiperazinoethanol*

A mixture of 130 g. (1.0 mole) of 4-hydroxyethylpiperazine and 85 g. (0.50 mole) of beta-benzyloxyethyl chloride in 500 cc. of toluene was refluxed with stirring for 5 hours. The reaction mixture was clarified by filtration and the filtrate subjected to fractional distillation in vacuo. The product was collected at 157–159° C. (0.10 mm.); yield 61.5 g.; $N_D^{25}$ 1.5319.

*Analysis.*—Calcd. for $C_{15}H_{24}N_2O_2$: N, 10.58. Found: N, 10.47.

EXAMPLE 4

*4-beta-benzyloxyethylpiperazinoethyl benzilate*

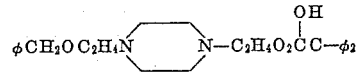

A mixture of 29.1 g. (0.11 mole) of beta-benzyloxyethylpiperazinoethanol, 24.2 g. (0.10 mole) methyl benzilate and 0.6 g. of sodium methoxide in 250 cc. of n-heptane was stirred and refluxed until no more methanol distilled over. The hot reaction mixture was clarified by filtration and the filtrate washed repeatedly with water. The organic phase was dried with potassium carbonate, filtered and the filtrate concentrated; 43 g. (91%) of a yellow oily residue remained which was converted to the dihydrochloride salt with ethereal HCl in acetone, M.P. 197–198° C.

*Analysis.*—Calcd. for $C_{29}H_{36}Cl_2N_2O_4$: Cl, 12.97; N, 5.11. Found: Cl, 13.16; N, 5.23.

EXAMPLE 5

*4-beta-hydroxyethylpiperazinoethyl benzilate dihydrochloride*

The dihydrochloride salt of Example 4 (30 g.) was dissolved in aqueous ethanol and subjected to hydrogenation at 60 lbs. p.s.i. of $H_2$ with 1.5 g. (10%) palladium-on-charcoal at 40° C. and the product isolated by removing the catalyst, concentrating the filtrate and crystallizing the residue from anhydrous ether, M.P. 194–195° C.

Analysis.—Calcd. for $C_{22}H_{30}Cl_2N_2O_4$: Cl, 15.52; N, 6.12. Found: Cl, 15.84; N, 6.17.

EXAMPLE 6

*4-beta-benzyloxyethylpiperazinoisopropyl phenylcyclohexyl glycolate*

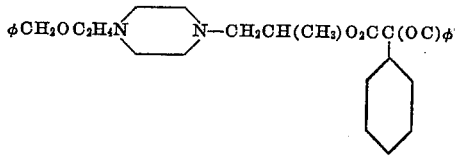

From 29.1 g. (0.11 mole) of beta-benzyloxyethyl-piperazinoethanol and 24.5 g. (0.10 mole) of methyl phenlycyclohexyl glycolate there was obtained 39 g. (81%) of the basic ester by the procedure described in Example 4.

EXAMPLE 7

*4-beta-hydroxyethylpiperazinoisopropyl phenylcyclohexyl glycolate dihydrochloride*

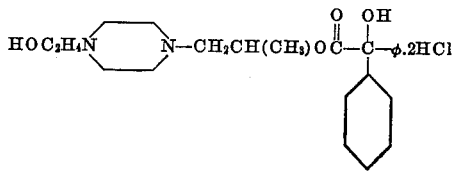

The basic ester of Example 6 was dissolved in aqueous ethanol containing two equivalents of hydrochloric acid. The benzyl group was cleaved by catalytic hydrogenation as described in Example 5.

EXAMPLE 8

*4-beta-benzyloxyethylpiperazinoethyl phenyl 2-thienyl glycolate*

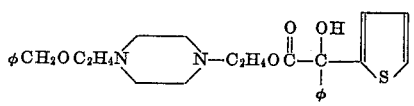

From 14.6 g. (0.055 mole) of beta-benzyloxyethyl-piperazinoethanol and 12.5 g. (0.05 mole) of methyl 2-thienyl phenyl glycolate, reacted as in Example 4, there was obtained 22 g. (92%) of the basic ester as an oil.

EXAMPLE 9

*4-beta-hydroxyethylpiperazinoethyl phenyl 2-thienyl glycolate dihydrochloroide*

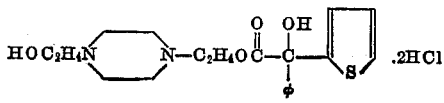

Reductive cleavage of 25 g. of the dihydrochloride salt of the base of Example 8 in 150 cc. of 70% aqueous ethanol with 1.0 g. of 10% palladium-on-charcoal as described in Example 5 gave the hydroxyethyl derivative.

Various changes and modifications of the invention can be made and, to the extent that such variations incorporate the spirit of this invention, they are intended to be included within the scope of the appended claims.

What is claimed is:
1. 4-beta-acetoxyethylpiperazinoethyl diphenyl chloroacetate.
2. 4-beta-hydroxyethylpiperazinoethyl benzilate.
3. 4-beta-benzyloxyethylpiperazinoethyl benzilate.
4. 4-beta-benzyloxyethylpiperazinoisopropyl phenylcyclohezyl glycolate.
5. 4-beta-benzyloxyethylpiperazinoethyl phenyl 2-thienyl glycolate.
6. 4-beta-hydroxyethylpiperazinoethyl phenyl 2-thienyl glycolate.
7. A member of the group consisting of compounds of the formulae

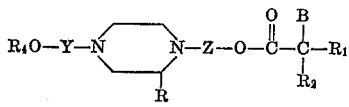

and

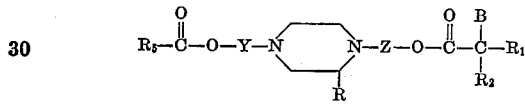

and acid addition salts thereof, wherein R is a member of the group consisting of hydrogen and the methyl group, $R_1$ is a member of the group consisting of the phenyl, thienyl, pyridyl and cyclohexyl groups, $R_2$ is a member of the group consisting of the phenyl, thienyl, furyl, cyclohexyl, cyclopentyl and lower alkyl groups, $R_4$ is a member of the group consisting of hydrogen, phenyl-lower alkyl and naphthyl-lower alkyl groups, B is a member of the group consisting of hydroxy and halo groups, $R_5$ is a lower alkyl group, and Y and Z are lower alkylene groups of at least two carbons each.

References Cited in the file of this patent

UNITED STATES PATENTS

| | | |
|---|---|---|
| 2,419,366 | Northey et al. | Apr. 22, 1947 |
| 2,574,407 | Malkemus | Nov. 6, 1951 |

FOREIGN PATENTS

| | | |
|---|---|---|
| 578,342 | Great Britain | June 25, 1946 |

OTHER REFERENCES

Hackh's Chemical Dictionary, p. 18, 3rd Ed. (1944).
Zaugg et al.: Journal American Chemical Soc., vol. 72, pp. 3004–3007 (1950).

UNITED STATES PATENT OFFICE

CERTIFICATE OF CORRECTION

Patent No. 2,993,900                          July 25, 1961

John H. Biel

It is hereby certified that error appears in the above numbered patent requiring correction and that the said Letters Patent should read as corrected below.

Column 5, line 12, EXAMPLE 6, extreme right-hand portion of the formula, for "(OC)∅" read -- (OH)∅ --.

Signed and sealed this 28th day of November 1961.

(SEAL)
Attest:

ERNEST W. SWIDER                                      DAVID L. LADD
Attesting Officer                                          Commissioner of Patents